Figure 1:
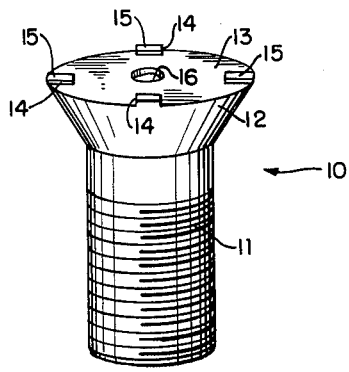

Dec. 28, 1965    H. E. VOEGELI    3,226,140

STUD ELEMENT

Filed Oct. 18, 1962

INVENTOR.
HENRY E. VOEGELI

BY
Pennie, Edmonds, Morton, Barrows & Taylor
ATTORNEYS

United States Patent Office 3,226,140
Patented Dec. 28, 1965

3,226,140
STUD ELEMENT
Henry E. Voegeli, Cheshire, Conn., assignor to The American Brass Company, a corporation of Connecticut
Filed Oct. 18, 1962, Ser. No. 231,494
1 Claim. (Cl. 287—20.2)

This invention relates to stud elements which have a solder deposit included in their construction so that they can be attached to a surface of a member without extending the element through the member. More particularly it relates to an element of this type which is constructed to define a space between the surface of the member and the end of the element, whereby heating of the solder causes it to flow into said space to contact the surface and solidify in sealing engagement with said surface.

The usual manner of erecting curtain walls and other metallic structures involves first drilling holes in appropriate portions of the wall or structure and then inserting threaded bolts or like attaching means through the holes. The bolts are then attached to suitable supporting members in the ordinary way to complete the assembly. It is often desirable to retain the continuity of the metal structure for the purpose of preventing the formation of apertures through which moisture or gaseous penetration might occur, or to maintain an unbroken surface so as to present an appealing smooth surface. Heretofore when it was found objectionable to have bolts extending through a metallic structure, the known alternative means of attaching the structure to supports were ordinarily too expensive or too difficult to warrant the advantages achieved. It is an object of this invention to provide a stud element which can be used to attach a metallic structure to supports without inserting a member through the structure, and one which is both inexpensive to manufacture and simple to use.

Broadly stated the stud element is for attachment to a surface and is comprised of a body portion, a head portion on the body portion, and an end on the head portion. A recess is formed in said head portion and opens at said end. A solder deposit is provided in said recess, and a raised surface contact portion extends from said end such that upon contact against said surface a space is defined between said surface and said end. Accordingly, upon heating said solder it is caused to melt and flow into said space and contact and solidify in sealing engagement with said surface.

The raised surface contact portion is preferably provided by a plurality of raised projections which are spaced around the periphery of the end of the head portion. These contact portions are arranged to provide for transmission of heat by conduction between the surface and the element during the soldering operation, while allowing space for exchange and flow of the solder when it is heated and melted.

It is to be noted that the stud element of the invention can be an integrally constructed member with a suitable solder plug deposited in the recess. Because of this, the steps in fabricating the stud element of the invention are no more difficult or costly than fabricating a standard stud bolt. Yet, by simply mounting the element so that the surface contact portions are in abutment against the metal surface to be attached, and heating the element by any suitable means, heat is transferred across the space between the end and the metal surface by means of the surface contact portions and the solder melts and flows into the space in contact with the metal surface and secures the element to the metal surface upon solidification.

Figure 2:
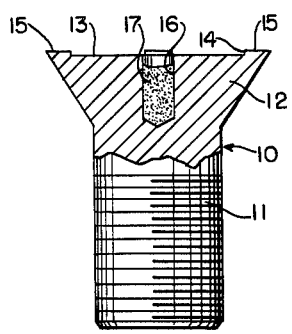
Figure 3:
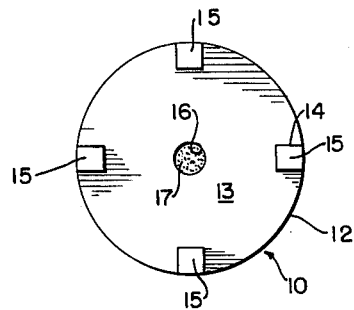

A preferred embodiment of the invention is described hereinbelow with reference to the drawing wherein:

FIG. 1 is a perspective of the stud element of the invention;
FIG. 2 is an elevation partly in section of the stud element;
FIG. 3 is a plan view of the head end portion of the stud element; and
FIG. 4 is an elevation partly in section of a stud element of the invention secured against the surface of a metal sheet and to a support.

The stud element 10 of the invention is comprised essentially of a threaded body portion 11 and a flange head portion 12. The head portion 12 flares to a diameter substantially larger than the body portion 11 and terminates with a head end portion 13. The end 13 is substantially flat and has a plurality (four here) of projections 14 extending therefrom, say, about 0.002 inch above said end. As shown, the projections 14 are substantially square bosses which are positioned at the periphery of the head portion 12 and are spaced from each other. The projections 14 terminate with substantially flat lands 15 and the lands of each of the projections preferably lie in substantially one plane so as to permit the projections to abut flushly against a metal sheet surface. Cut axially into the head portion 12 of the element and opening at substantially the center of the head end portion 13 is a recess 16. A plug 17 of solder is deposited in the recess 16. The solder preferred is silver, but other solders with or without a flux may be contained therein.

Figure 4:
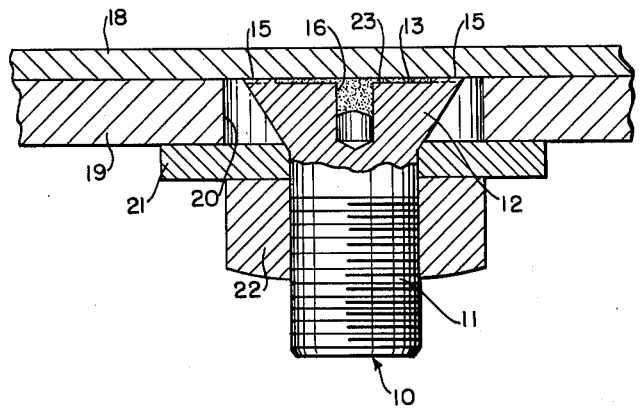

Referring now to FIG. 4, the stud element 10 is shown holding a metal sheet 18 to a supporting member 19. In this embodiment, the supporting member 19 is, say, a transverse member of which preferably a plurality are provided for supporting an elongated continuous metal sheet 18. The metal sheet 18 is stretched across several of the supporting members 19. A number of stud elements 10 would be spaced from each other along the supporting member 19. An opening 20 is provided in the supporting member 19 which is with a larger diameter than the head portion 12. A washer 21 of larger diameter than the opening 20 is slipped onto the body position 11 of the element and a nut 22 is screwed into the threaded body portion 11 thereby forcing the washer 21 against the support 19 and forcing surface contact projections 14 into flush abutment with the metal sheet 18. When the stud element 10 is positioned in this manner, a space 23 is defined between the head end 13 and the metal sheet 18. Once the assembly is arranged as described, heat is applied either to the sheet immediately over the element, or to the element itself by any suitable means, such as a torch or an induction heating coil, or the like. This heating will cause the solder 17 to melt and expand, and flow into the space 23, thereby wetting the portion of the sheet 18 spaced above the head end 13. Once the solder has flowed into the space 23, the heat source is removed and the solder material will solidify into a strong mechanical bond between the stud element 10 and the metal sheet 18.

Several advantages are readily apparent with the stud element of the invention. It is not necessary to drill or punch any holes in the metal sheet and, thus, a positive water-tight assembly is realized without need of the usual sealing washers and the like as are necessary with screws and nails. Moreover, after the metal sheet is assembled there are still no bolt heads or screw heads visible on the external surface of the curtain wall, thereby presenting an architectural surface which is smooth. Further, since the elements are attached only upon final assembly, all difficulties due to mismatching or misalignment of studs and holes is obviated. Finally, owing to the particular construction of the elements, they can be easily and cheaply fabricated using ordinary fabricating methods.

I claim:

A stud element for attachment to a member comprising:
(a) a body portion,
(b) a head portion on one end of said body portion having a larger diameter than the body portion,
(c) a substantially flat end surface on said head portion,
(d) a recess formed substantially axially into said head portion and opening at substantially the center of said end surface,
(e) a solder deposit contained within said recess,
(f) a plurality of raised contact portions integral with said flat end surface on said body head portion and extending axially therefrom and spaced from each other, and
(g) flats defined on said raised portions which lie substantially in one plane so as to permit the raised portions to abut flushly against a member and define a space between the end portion and the member, the relationship between the size of the recess and the solder contained therein and the axial extent of the contact portions being such that upon heating solder flowing into said space, will be retained in said space and will contact and solidify a sealing engagement with said member.

References Cited by the Examiner

UNITED STATES PATENTS

| | | | |
|---|---|---|---|
| 997,420 | 7/1911 | Seng | 29—502 X |
| 1,936,018 | 11/1933 | Hodgson | 29—501 X |
| 1,982,098 | 11/1934 | Hartmann | 151—41.7 |
| 2,550,357 | 4/1951 | Jansen et al. | 151—41.7 |
| 2,568,242 | 9/1951 | Matteson | 29—502 X |
| 2,760,797 | 8/1956 | Woodling. | |
| 2,993,982 | 7/1961 | Glover. | |

FOREIGN PATENTS 720,402   12/1954   Great Britain.

OTHER REFERENCES

Parker-Kalon Rimguard Weld Screws (pamphlet).

CARL W. TOMLIN, *Primary Examiner.*

THOMAS F. CALLAGHAN, *Examiner.*